Figure 1:
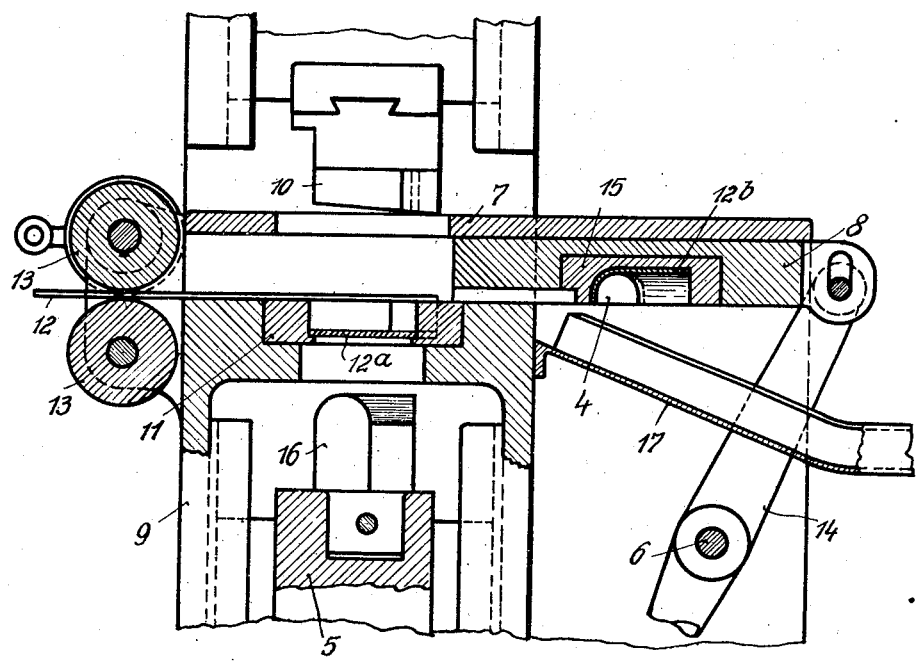

July 28, 1931. O. REIFURTH 1,816,298
MANUFACTURE OF HOLLOW SHEET METAL SHAPES
Filed May 9, 1929    2 Sheets-Sheet 1

Inventor:
Otto Reifurth
by [signature]
Atty.

July 28, 1931. O. REIFURTH 1,816,298
MANUFACTURE OF HOLLOW SHEET METAL SHAPES
Filed May 9, 1929 2 Sheets-Sheet 2
FIG.2.
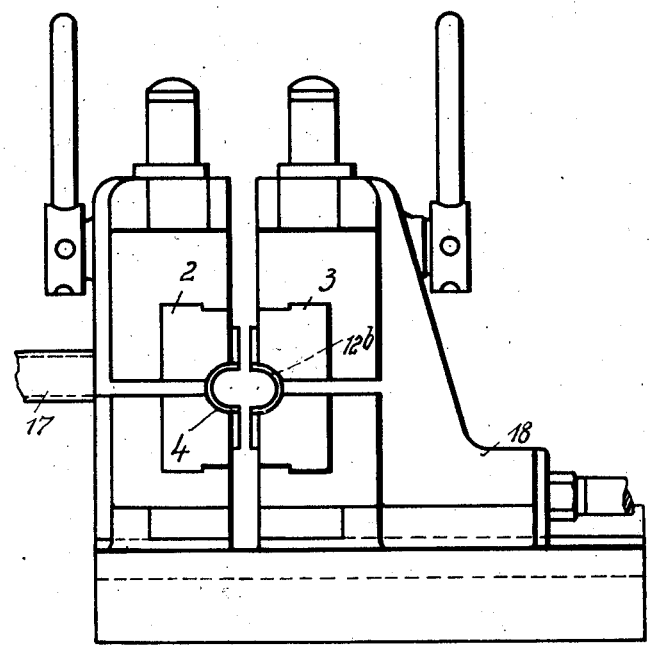
FIG.6. FIG.7. FIG.8. FIG.9. FIG.10.
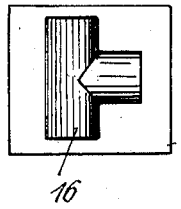 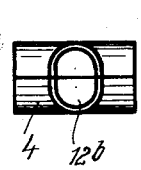 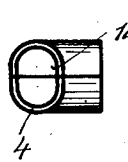  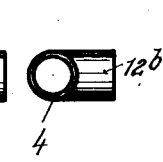
*Inventor:*
*Otto Reifurth*
by *Kuscharin*
*Atty.*

Patented July 28, 1931

1,816,298

UNITED STATES PATENT OFFICE

OTTO REIFURTH, OF IMMIGRATH, GERMANY

MANUFACTURE OF HOLLOW SHEET METAL SHAPES

Application filed May 9, 1929, Serial No 361,686, and in Germany November 20, 1928.

My invention relates to a method of and apparatus for making hollow sheet metal shapes, for instance fittings for the connection of pipes. It is an object of my invention to provide shapes of the kind described which are more suitable for high pressures and more satisfactory in a general way than the cast iron fittings which were employed heretofore.

To this end I make such shapes or fittings from punched sheet metal blanks which are forged into the shape of one half of the finished part, and I connect two halves by mechanical or electrical welding. Preferably the welding seams are arranged so as to coincide with the axial planes of the parts which are to be connected by the fittings. For instance in a fitting for connecting pipes as will be described further below, the seams extend in the axial planes of the pipes to be connected.

As mentioned above, cast fittings are not capable of withstanding high pressures and cannot therefore be used in pipe lines in which such pressures prevail. Casting fittings are also subject to considerable wear and, if threaded, have a tendency to break at the throat of the threaded portions.

It has also been suggested to bore and tap rolled solid blanks, but this mode of proceeding is extremely wasteful. It has also been proposed to punch flat blanks to the developed size of the fittings from sheet metal, to forge them, to shape and to connect them by manual welding, but this method is uneconomic and it has been attempted to improve it by cutting tubular blanks to shape and connecting these shapes by welding. This, however, involves the drawback that the blanks must be cut to penetration curves and must be welded along such curves, resulting in welding seams which are in an unfavorable position with respect to the forces acting on the fitting.

These drawbacks are overcome according to my invention in which two flat identical blanks the configuration of each of which constitutes if developed about one half of the finished article are forged into the desired shape by means of dies and are then welded in an electric welding machine of some suitable type. Welding additions are made when punching. By so arranging the welding seams that they coincide with the axial planes of the parts which are to be connected by the fittings, their strength is greatly increased.

In the drawings affixed to this specification and forming part thereof a punching and welding machine and its blanking and forging dies embodying my invention and various stages of manufactures of a T for connecting three pipes are illustrated diagrammatically by way of example.

In the drawings

Figure 3:
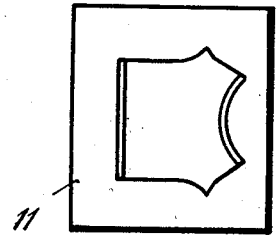
Figure 4:
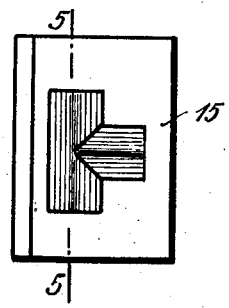
Figure 5:
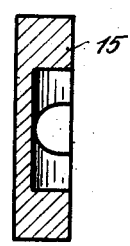

Fig. 1 is an elevation of the punching and forging machine, partly in section,

Fig. 2 is an elevation of the welding machine to which the forged blanks are delivered from the punching machine, Fig. 3 is a section of the blanking die of the punching machine, Fig. 4 is a plan view of the female forging die, viewed from below, Fig. 5 is a section on the line 5—5 in Fig. 4, Fig. 6 is a plan view of the male forging die, Fig. 7 is an elevation of the two halves of a fitting ready for welding, Fig. 8 is an end elevation of the blank, viewed from the left in Fig. 7, Figs. 9 and 10 are elevations of the finished fitting, viewed in the same direction as Figs. 7 and 8.

Referring now to the drawings and first to Figs. 1 and 2, 9 is the frame of the punching machine, 10 is a punch which is arranged to reciprocate in the frame of the machine and is operated by suitable means (not shown). 11 is a blanking die secured in the frame 9 below the punch 10, the punch and the hole in the blanking die 11 being shaped to the development of the halves from which the fittings are welded plus a welding addition, 12 is a sheet metal strip which is fed below the punch 10 by means of rollers 13, 13, 8 is a slide supported for reciprocatory movement in a guide 7 of the frame 9, 15 is a female die inserted in a cavity of the slide 8 and 14 is a rocking lever pivoted in the frame 9 at 6 and arranged to reciprocate the slide 8, when rocking movement is imparted to the lever 14 by suitable means (not shown).

In operation a blank 12a is punched from the strip 12 after the slide 8 has been retracted into the position illustrated in Fig. 1, and is left in the blanking die 11. The slide 8 with the female die 15 is now advanced so as to bring the die into register with the blanking die 11 and a male die 16 at the end of a head 5 is then advanced into the die 15 through the blanking die 11. The blank is forged into the T illustrated in Fig. 8, which comprises a semi-cylinder 4 plus welding additions extending at right angles to the direction in which the slide 8 reciprocates, and a semi-cylinder 12b, also plus welding additions, extending in parallel to the direction of reciprocation.

The forged blank is now delivered to a chute 17 and taken to the welding machine 18, in the jaws 2 and 3 of which two forged blanks are placed in such position that their edges will meet when the jaws are closed. Current is applied and the blanks are welded into the finished fitting illustrated in Figs. 9 and 10, which is ready for threading.

In the foregoing I have described the manufacture of fittings for pipes, but I wish it to be understood that many other articles may be manufactured according to my invention, such as bends, cross-shaped articles, etc.

I wish it to be understood that I do not desire to be limited to the exact details of construction shown and described for obvious modifications will occur to a person skilled in the art.

In the claim affixed to this specification no selection of any particular modification of the invention is intended to the exclusion of other modifications thereof and the right to subsequently make claim to any modification not covered by the claim is expressly reserved.

I claim:—

A shaping machine for making hollow metal shapes two of which are subsequently to be welded into a finished article, comprising a fixed blanking die and a reciprocating punch for cutting from sheet metal a blank corresponding to the spread-out shape of the finished half of said article, means on said blanking die for retaining the blank therein, a male die arranged below said blanking die in line with said punch and adapted to penetrate through said blanking die, a female die, means for advancing said female die into aligned relation with respect to said punch, said blanking die and said male die transversely to said punch and to said male die, and for retracting it after the forging operation has been completed, and a chute for receiving the finished article from said retracted female die.

In testimony whereof I affix my signature.

OTTO REIFURTH.